US010694007B1

(12) United States Patent
Bellorado et al.

(10) Patent No.: US 10,694,007 B1
(45) Date of Patent: *Jun. 23, 2020

(54) PREAMBLE DEFECT DETECTION AND MITIGATION

(71) Applicant: Seagate Technology LLC, Cupertino, CA (US)

(72) Inventors: Jason Vincent Bellorado, San Jose, CA (US); Marcus Marrow, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,225

(22) Filed: Apr. 1, 2019

Related U.S. Application Data

(63) Continuation of application No. 15/359,591, filed on Nov. 22, 2016, now Pat. No. 10,277,718.

(51) Int. Cl.
| | |
|---|---|
| *H04B 3/46* | (2015.01) |
| *H04B 17/00* | (2015.01) |
| *H04Q 1/20* | (2006.01) |
| *H04L 29/06* | (2006.01) |
| *G11B 20/18* | (2006.01) |
| *H04L 7/00* | (2006.01) |
| *H04L 7/10* | (2006.01) |
| *G11B 20/10* | (2006.01) |

(52) U.S. Cl.
CPC ........ *H04L 69/22* (2013.01); *G11B 20/10222* (2013.01); *G11B 20/18* (2013.01); *G11B 20/1889* (2013.01); *H04L 7/0016* (2013.01); *H04L 7/0025* (2013.01); *H04L 7/10* (2013.01)

(58) Field of Classification Search
CPC ..... H04L 69/22; H04L 7/0025; H04L 7/0016; H04L 7/10; G11B 20/18; G11B 20/10222; G11B 20/1889
USPC ........................................................ 375/226
See application file for complete search history.

(56) References Cited

U.S. PATENT DOCUMENTS

| | | |
|---|---|---|
| 5,563,746 A | 10/1996 | Bliss |
| 5,726,818 A | 3/1998 | Reed et al. |
| 5,754,352 A | 5/1998 | Behrens et al. |
| 5,793,548 A | 8/1998 | Zook |
| 5,822,142 A | 10/1998 | Hicken |
| 5,909,332 A | 6/1999 | Spurbeck et al. |
| 5,954,837 A | 9/1999 | Kim |
| 6,069,758 A | 5/2000 | Chung |
| 6,172,836 B1 | 1/2001 | Bang |
| 6,275,346 B1 | 8/2001 | Kim et al. |

(Continued)

*Primary Examiner* — Tanmay K Shah
(74) *Attorney, Agent, or Firm* — Setter Roche LLP; Christian W. Best

(57) ABSTRACT

Systems and methods are disclosed for detection and mitigation of defects within a preamble portion of a signal, such as a data sector preamble recorded to a data storage medium. In certain embodiments, an apparatus may comprise a circuit configured to synchronize a sampling phase for sampling a signal pattern. The circuit may sample a preamble field of the signal pattern to obtain sample values, split the sample values into a plurality of groups, determine defect groups having samples corresponding to defects in the preamble field, remove the defect groups from the plurality of groups, and synchronize the sampling phase based on the plurality of groups.

20 Claims, 9 Drawing Sheets

(56) References Cited

U.S. PATENT DOCUMENTS

| | | |
|---|---|---|
| 6,307,696 B1 | 10/2001 | Bishop et al. |
| 6,353,649 B1 | 3/2002 | Bockleman et al. |
| 6,480,349 B1 | 11/2002 | Kim et al. |
| 6,594,094 B2 | 7/2003 | Rae et al. |
| 6,594,098 B1 | 7/2003 | Sutardja |
| 6,760,185 B1 | 7/2004 | Roth et al. |
| 6,973,150 B1 | 12/2005 | Thuringer |
| 6,996,193 B2 | 2/2006 | Yamagata et al. |
| 7,035,029 B2 | 4/2006 | Sawada et al. |
| 7,068,461 B1 | 6/2006 | Chue et al. |
| 7,199,956 B1 | 4/2007 | Moser et al. |
| 7,602,568 B1 | 10/2009 | Katchmart |
| 7,643,548 B2 | 1/2010 | Hafeez |
| 7,665,007 B2 | 2/2010 | Yang et al. |
| 7,738,538 B1 | 6/2010 | Tung |
| 7,917,563 B1 | 3/2011 | Shih et al. |
| 7,995,691 B2 | 8/2011 | Yang |
| 7,997,582 B2 | 8/2011 | Wong |
| 8,077,571 B1 | 12/2011 | Xia et al. |
| 8,139,305 B2 | 3/2012 | Mathew et al. |
| 8,266,505 B2 | 9/2012 | Liu et al. |
| 8,400,726 B1 | 3/2013 | Wu et al. |
| 8,516,347 B1 | 8/2013 | Li et al. |
| 8,625,216 B2 | 1/2014 | Zhang et al. |
| 9,043,688 B1 | 5/2015 | Chan et al. |
| 9,077,501 B1 | 7/2015 | Oberg et al. |
| 9,129,646 B2 | 9/2015 | Mathew et al. |
| 9,178,625 B1 | 11/2015 | Hueda et al. |
| 9,236,952 B2 | 1/2016 | Sun et al. |
| 9,362,933 B1 | 6/2016 | Chaichanavong |
| 9,613,652 B2 | 4/2017 | Link et al. |
| 2002/0094048 A1 | 7/2002 | Simmons et al. |
| 2003/0026016 A1 | 2/2003 | Heydari et al. |
| 2003/0048562 A1 | 3/2003 | Heydari et al. |
| 2003/0185291 A1 | 10/2003 | Nakahira et al. |
| 2004/0047403 A1 | 3/2004 | Choi et al. |
| 2007/0002890 A1 | 1/2007 | Mangold et al. |
| 2007/0018733 A1 | 1/2007 | Wang et al. |
| 2007/0205833 A1 | 9/2007 | Mar et al. |
| 2008/0292029 A1 | 11/2008 | Koslov |
| 2009/0268857 A1 | 10/2009 | Chen et al. |
| 2010/0138722 A1 | 6/2010 | Harley et al. |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0176154 A1* | 7/2013 | Bonaccio ............. H03M 1/182 341/118 |
| 2013/0182347 A1 | 7/2013 | Maeto |
| 2013/0339827 A1 | 12/2013 | Han et al. |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1 | 7/2015 | Ng et al. |
| 2016/0055882 A1 | 2/2016 | Cideciyan et al. |
| 2016/0134449 A1 | 5/2016 | Liu et al. |
| 2016/0156493 A1 | 6/2016 | Bae et al. |
| 2016/0270058 A1 | 9/2016 | Furuskog et al. |
| 2016/0293205 A1 | 10/2016 | Jury et al. |
| 2017/0162224 A1 | 6/2017 | Mathew et al. |

* cited by examiner

PREAMBLE DEFECT DETECTION AND MITIGATION

SUMMARY

In certain embodiments, an apparatus may comprise a circuit configured to synchronize a sampling phase for sampling a signal pattern. The circuit may sample a preamble field of the signal pattern to obtain sample values, split the sample values into a plurality of groups, determine defect groups having samples corresponding to defects in the preamble field, remove the defect groups from the plurality of groups, and synchronize the sampling phase based on the plurality of groups.

In certain embodiments, a method may comprise synchronizing a sampling phase for sampling a signal pattern, including sampling a preamble field of the signal pattern to obtain sample values, splitting the sample values into a plurality of groups, determining defect groups having samples corresponding to defects in the preamble field, removing the defect groups from the plurality of groups, and synchronizing the sampling phase based on the remaining plurality of groups.

In certain embodiments, an apparatus may comprise a clock signal generator configured to generate clock pulses, an analog-to-digital converter configured to sample a signal at a sampling phase controlled by the clock pulses to obtain sample values, and a preamble error detection module. The preamble error detection module may be configured to split preamble sample values into a plurality of groups, the preamble sample values including sample values sampled from a preamble field of the signal, determine defect groups having sample values corresponding to defects in the preamble field, remove the defect groups from the plurality of groups, and synchronize the sampling phase to the signal based on the plurality of groups.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
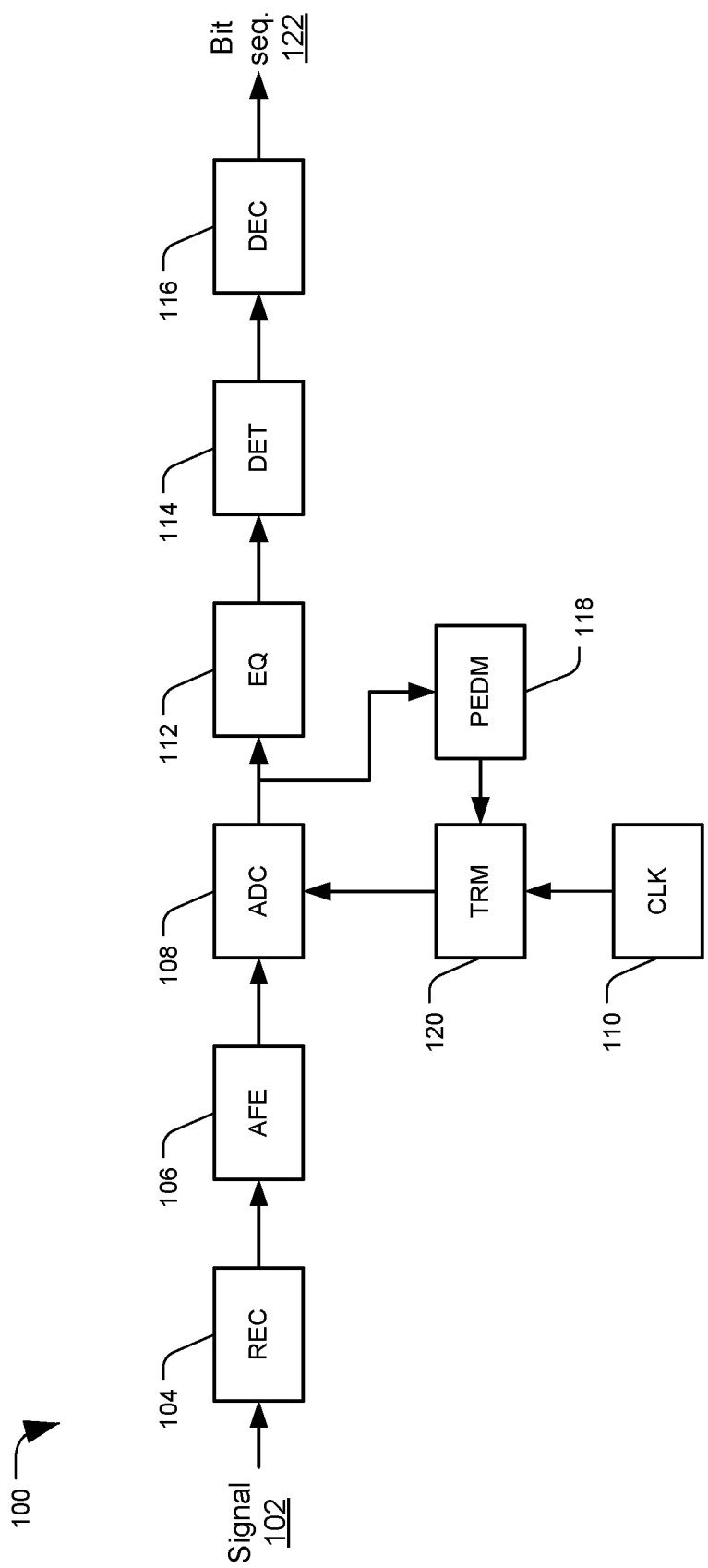
FIG. 1 is a diagram of a system configured to perform preamble defect detection and mitigation, in accordance with certain embodiments of the present disclosure.

FIG. 1 is a diagram of a system configured to perform preamble defect detection and mitigation, generally designated 100, in accordance with certain embodiments of the present disclosure. The system 100 may include components of a communications channel by which an information signal 102 is received and processed to obtain data, such as a sequence of bits 122. A channel may be employed at a receiving end of wired or wireless transmissions, or in devices such as hard drives for storing data to and retrieving data from a storage medium. Some storage devices, such as hard disc drives, may include more than one channel, such as a data channel for processing data storage sectors, and a servo channel for processing servo sectors. The components of the channel may include circuitry, registers, and modules configured to perform operations in relation to the signal 102, and may be included on one or more chips of a device. Although examples and illustrative embodiments provided herein may be directed to implementations within a data storage device (DSD), the applicability of the techniques are not limited thereto.

System 100 may include a receiver 104 configured to receive a signal 102. For example, the receiver 104 may be an antennae that receives wireless signals 102, or a read head that detects magnetic fields 102 stored to a hard drive. The receiver 104 may provide the received signal to an analog front end (AFE) 106, which may be circuitry configured to condition an analog signal via amplifiers, filters, and other operations, before providing the conditioned signal to other components for further processing. An analog to digital converter (ADC) 108 may periodically sample the conditioned analog signal at a frequency controlled by a clock signal generator 110, which may generate regular clock pulses at a set frequency. The clock signal from the clock signal generator 110 may be modified by a timing recovery module (TRM) 120, which may include a phase interpolator and other components used to adjust the clock signal to achieve a desired or selected sampling phase. Sampling the signal at the ADC 108 may include converting a continuous physical quantity (e.g. voltage) of the signal into a digital number or value representing the quantity's amplitude. The digital values from the ADC 108 may be provided to an equalizer 112, which may reverse or reduce distortions in the signal. The equalized signal may be provided to a detector 114, which may determine the bit sequence provided by the signal based on the sampled values from the ADC (e.g. whether the sample values indicate a 1 or a 0). The detected bit stream may be passed to a decoder 116, which may decode the bit stream into usable data. For example, the data in the signal 102 may be encoded with an error correction code, and the decoder 116 may attempt to determine and correct errors in the detected bits based on the error correction code. The decoder 116 may output a bit sequence 122 of decoded and error-corrected bits, representing the data encoded within the signal 102.

An example channel 100 may include a data channel used to detect data or servo sectors recorded to a hard disc or other rotating storage media. Sectors may be preceded by a preamble signal pattern that identifies the beginning of the sector and may be used to set a sampling phase at which the sector may be sampled to accurately retrieve data. System 100 may include a preamble error detection module (PEDM) 118. The PEDM 118 may receive preamble sample values from the ADC 108, from the EQ 112, or from another component, and determine the existence of defects within the preamble based on the samples. The PEDM 118 may then discard samples corresponding to defects when determining a sampling phase at which the preamble samples were taken. The PEDM may determine a sampling phase adjustment from the non-defect samples. The determined sampling phase adjustment may be used to adjust a clock signal phase produced by the clock signal generator 110, e.g. via TRM 120, in order to adjust a sampling phase at the ADC 108. Alternately, the TRM 120 may determine sampling phase adjustments, and the PEDM 118 may provide the TRM 120 with all samples along with the locations of defects, or with the non-defect samples. The detection and mitigation of preamble defects will be discussed in greater detail in regards to the following figures.

Figure 2:
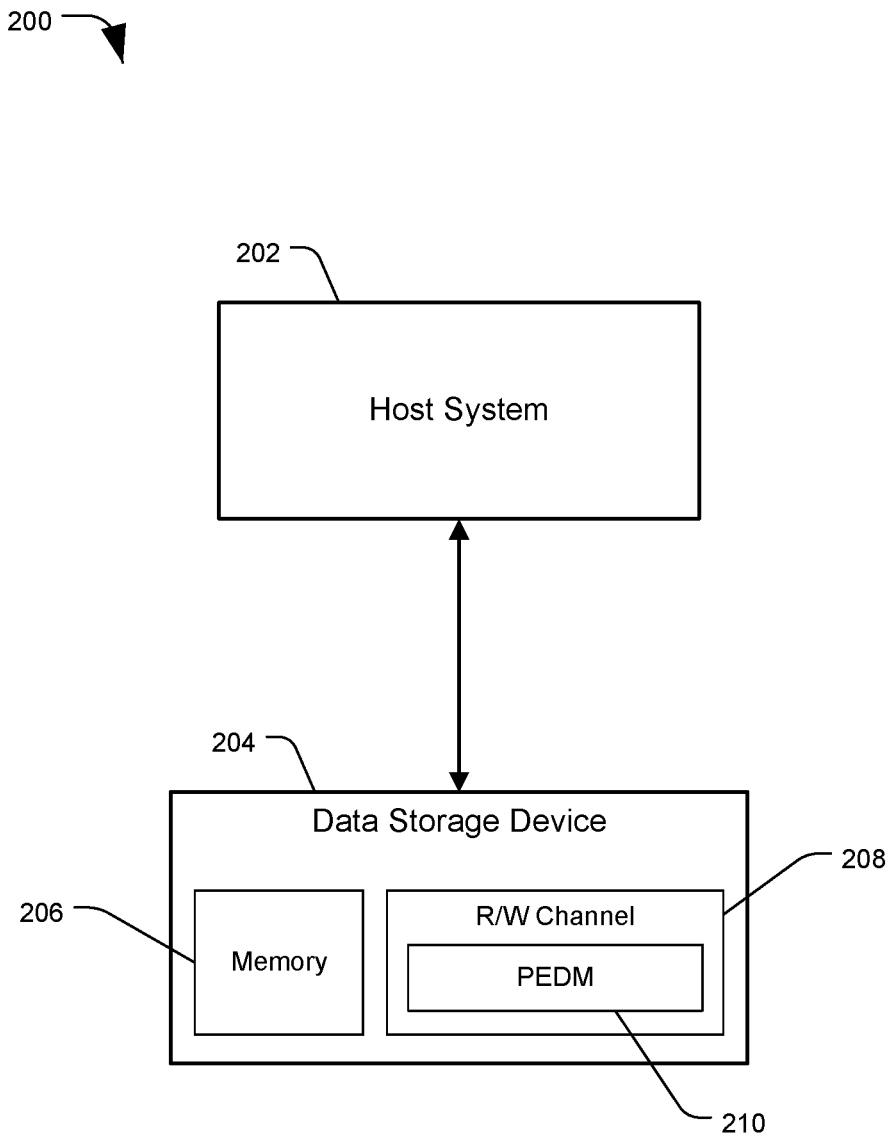
FIG. 2 is a diagram of a system configured to perform preamble defect detection and mitigation, in accordance with certain embodiments of the present disclosure.

FIG. 2 is a diagram of a system configured to perform preamble defect detection and mitigation, generally designated 200, in accordance with certain embodiments of the present disclosure. The system 200 may include a host 202 and a data storage device (DSD) 204. The host 202 may also be referred to as the host system or host computer. The host 202 can be a desktop computer, a laptop computer, a server, a tablet computer, a telephone, a music player, another electronic device, or any combination thereof. Similarly, the DSD 204 may be any of the above-listed devices, or any other device which may be used to store or retrieve data, such as a hard disc drive (HDD) or hybrid drive. The host 202 and DSD 204 may be connected by way of a wired or wireless connection, or by a local area network (LAN) or wide area network (WAN). In some embodiments, the DSD 204 can be a stand-alone device not connected to a host 202 (e.g. a removable data storage device having its own case or housing), or the host 202 and DSD 204 may both be part of a single unit (e.g. a computer having an internal hard drive).

The DSD 204 may include a memory 206 and a read/write (R/W) channel 208, such as the channel described in regards to FIG. 1. The memory 206 may comprise one or more data storage mediums, such as magnetic storage media like disc drives, other types of memory, or a combination thereof. The DSD 204 may receive a data access request, such as a read or write request, from the host device 202. In response, the DSD 204 may perform data access operations on the memory 206 via the R/W channel 208 based on the request. The R/W channel 208 may comprise one or more circuits or processors configured to process signals for recording to or reading from the memory 206.

DSD 204 may include a preamble error detection module (PEDM) 210, such as the PEDM 118 of FIG. 1. The PEDM 210 may perform the methods and processes described herein to detect errors or defects in a selected signal pattern, and to exclude the defects when determining a sampling phase at which the selected signal pattern was sampled. The determined sampling phase may be adjusted to achieve a selected sampling phase for sampling a signal. An example embodiment of system 200, including a more detailed diagram of DSD 204, is depicted in FIG. 3.

Figure 3:
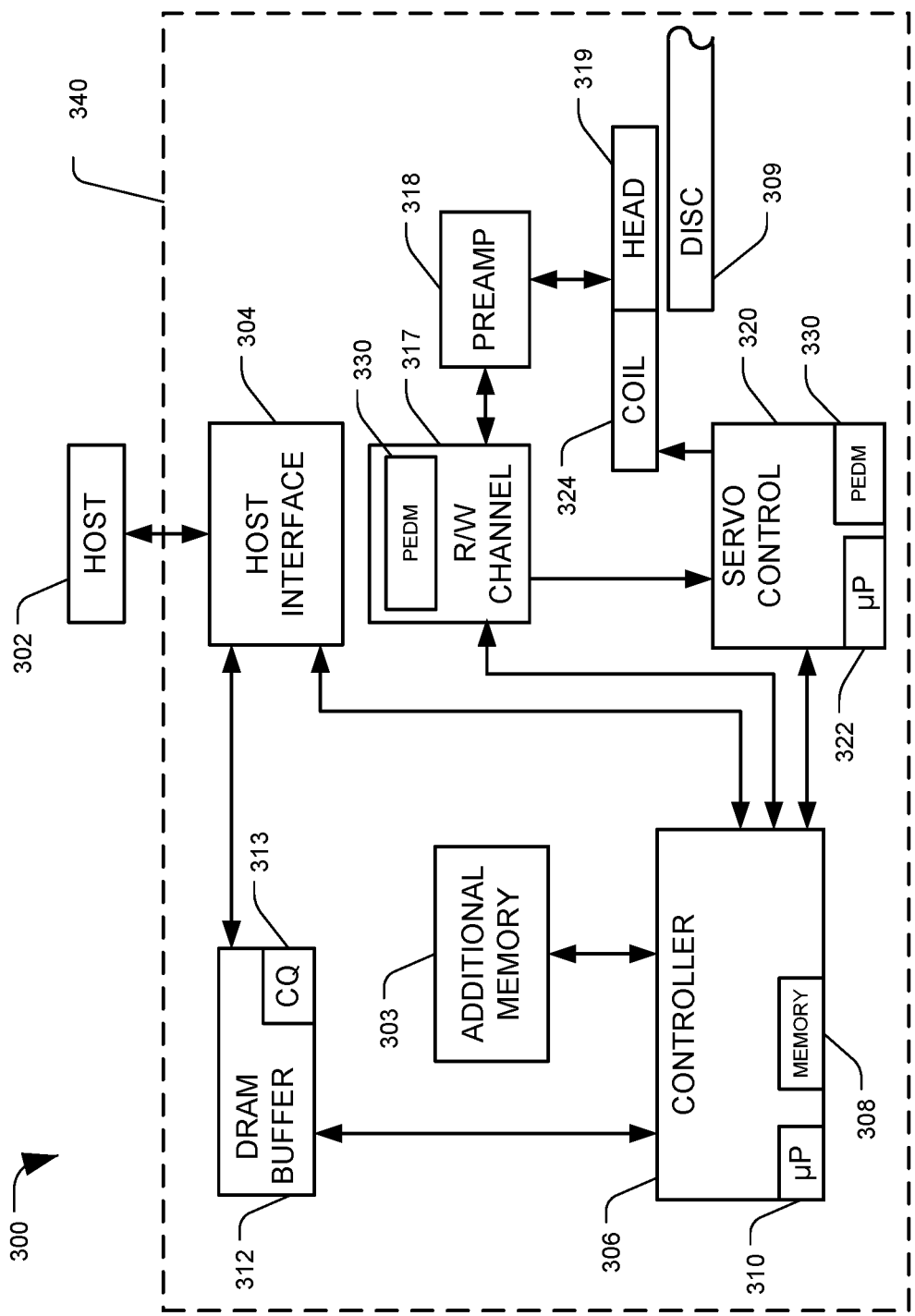
FIG. 3 is a diagram of a system configured to perform preamble defect detection and mitigation, in accordance with certain embodiments of the present disclosure.

FIG. 3 is a diagram of a system configured to perform preamble defect detection and mitigation, generally designated 300, in accordance with certain embodiments of the present disclosure. Specifically, FIG. 3 provides a functional block diagram of an example data storage device (DSD) 300. The DSD 300 can communicate with a host device 302 (such as the host system 202 shown in FIG. 2) via a hardware or firmware-based interface circuit 304. The interface 304 may comprise any interface that allows communication between a host 302 and a DSD 300, either wired or wireless, such as USB, IEEE 1394, Compact Flash, SATA, eSATA, PATA, SCSI, SAS, PCIe, Fibre Channel, Ethernet, or Thunderbolt, among others. The interface 304 may include a connector (not shown) that allows the DSD 300 to be physically removed from the host 302. The DSD 300 may have a casing 340 housing the components of the DSD 300, or the components of the DSD 300 may be attached to the housing, or a combination thereof. The DSD 300 may communicate with the host 302 through the interface 304 over wired or wireless communication.

The buffer 312 can temporarily store data during read and write operations, and can include a command queue (CQ) 313 where multiple pending operations can be temporarily stored pending execution. Commands arriving over the interface 304 may automatically be received in the CQ 313 or may be stored there by controller 306, interface 304, or another component.

The DSD 300 can include a programmable controller 306, which can include associated memory 308 and processor 310. The controller 306 may control data access operations, such as reads and writes, to one or more disc memories 309. The DSD 300 may include an additional memory 303 instead of or in addition to disc memory 309. For example, additional memory 303 can be a solid state memory, which can be either volatile memory such as DRAM or SRAM, or non-volatile memory, such as NAND Flash memory. The additional memory 303 can function as a cache and store recently or frequently read or written data, or data likely to be read soon. Additional memory 303 may also function as main storage instead of or in addition to disc(s) 309. A DSD 300 containing multiple types of nonvolatile storage mediums, such as a disc(s) 309 and Flash 303, may be referred to as a hybrid storage device.

The DSD 300 can include a read-write (R/W) channel 317, which can encode data during write operations and reconstruct user data retrieved from a memory, such as disc(s) 309, during read operations. A preamplifier circuit (preamp) 318 can apply write currents to the head(s) 319 and provides pre-amplification of read-back signals. In some embodiments, the preamp 318 and head(s) 319 may be considered part of the R/W channel 317. A servo control circuit 320 may use servo data to provide the appropriate current to the coil 324, sometimes called a voice coil motor (VCM), to position the head(s) 319 over a desired area of the disc(s) 309. The controller 306 can communicate with a processor 322 to move the head(s) 319 to the desired locations on the disc(s) 309 during execution of various pending commands in the command queue 313. The DSD 300 may have two distinct channels for processing data sectors and servo sectors (e.g. a data channel and a servo channel), although in some embodiments a single channel may be used for both types of signal processing, or certain components may be shared by both channels. For example, the preamp 318 and R/W channel 317 may include components used when processing servo data, and the servo control 320 may also include components of the servo channel and perform servo signal processing.

DSD 300 may include a preamble error detection module (PEDM) 330. The PEDM 330 may perform the methods and processes described herein to detect errors or defects in a selected signal pattern, and to exclude the defects when determining a sampling phase at which the selected signal pattern was sampled. The determined sampling phase may be adjusted to achieve a selected sampling phase used to sample a signal. The PEDM 330 may be a processor, controller, or other circuit, or it may be a set of software instructions that, when executed by a processing device, perform the functions of the PEDM 330. In some embodiments, the PEDM 330 may be part of or executed by R/W channel 317, part of or executed by servo control circuit 320, included in or performed by other components of the DSD 300, a stand-alone component, or any combination thereof. Additional details on a disc memory 309 and related signal processing are discussed in regard to FIG. 4.

Figure 4:
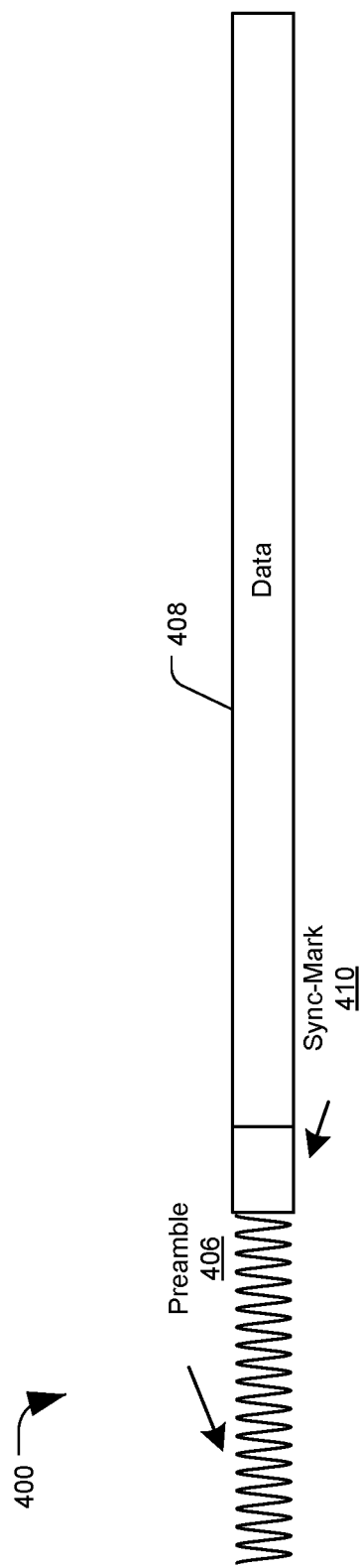
FIG. 4 is a diagram of a system configured to perform preamble defect detection and mitigation, in accordance with certain embodiments of the present disclosure.

FIG. 4 is a diagram of a system configured to perform preamble defect detection and mitigation, in accordance with certain embodiments of the present disclosure. In particular, FIG. 4 depicts an example sector 400, such as a data sector or servo sector, recorded to a data storage medium such as a magnetic disc.

In most sampled data systems, such as in a channel as described in regard to FIG. 1, operations may be performed based on the expectation that the sampling of a continuous-time waveform is conducted at a predetermined, desired, sampling phase. In many implementations, synchronizing the sampling phase to the signal is accomplished by preceding a data pattern 408 (e.g. a portion of a sector to which user data or other information may be stored) with a known data sequence that generates a readback waveform that is suitable for this synchronization purpose. In the context of magnetic recording, for example, each data sector and servo sector may be preceded, first, by a field 406 consisting of a repeated pattern of N ones (e.g. the media is polarized in one direction) followed by N zeros (e.g. the media is polarized in the opposite direction). For example, the field 406 may include a pattern 00110011 etc. (which may be referred to as a "2T" pattern), or 000111000111 etc. (which may be referred to as a "3T" pattern). Due to intersymbol interference, the readback waveform produced by this field, often referred to as the preamble field 406, may resemble a sine wave. The preamble pattern may be used to estimate the sampling phase (e.g. the phase at which the signal is being sampled) such that the sampling phase may be adjusted to a selected sampling phase having a desired value. Synchronizing the sampling phase to the signal allows samples to be taken at one or more expected points within a signal period. The preamble field 406 may be followed by a sync-mark 410 (sometimes called a servo timing mark STM for servo sectors), which marks the end of the preamble 406 and, thus, the start of the data field 408. Once the sampling phase is synchronized and the sync-mark 410 is located, the data sequence stored to the data field 408 can then be demodulated.

Synchronization of the sampling phase to its desired value using the preamble field 406 (a procedure which may be referred to as acquisition) may be accomplished by estimating the phase at which the sine-wave is being sampled and adjusting it to a desired, target, value. For example, if it is estimated that the preamble 406 is being sampled at $\theta=22°$ (theta equal to twenty-two degrees), and the desired sample phase is $\theta=45°$, then the sampling phase may then be adjusted by $+23°$ to achieve the desired sampling phase.

The correct operation of acquisition can be critical to the successful retrieval of its associated data fragment (e.g. the information stored to the data segment 408). In some embodiments the acquisition procedure may be followed by a timing (tracking) loop which acts to maintain the desired sampling phase through the remainder of the data sector. For example, a timing loop may determine a timing offset based on sampled values, and the timing offset may be used to adjust the timing signals provided to the analog to digital converter (ADC) to modify the sampling phase, thereby maintaining the desired sampling phase while reading data from the sector. A tracking loop, however, may only be able to correctly function if the sampling phase does not deviate too significantly from the desired sampling phase and, thus, may require a reliable acquisition operation. If the acquisition operation incorrectly sets the sampling phase due to, for example, defects in the preamble, the channel may be unable to correct itself via the timing loop and be unable to correctly detect and decode data from the sector.

As stated, the acquisition operation may be unreliable when the media to which the preamble pattern is written contains defects (e.g. anomalies in the media which cause an erroneous readback signal). Although a screening procedure may be employed during manufacturing of the storage media to avoid using media having defects, the process may not catch all defects. Furthermore, since defects may grow in magnitude after the manufacturing process, they may compromise the integrity of a preamble after the screening procedure has been conducted.

However, a method is described herein to address the cases in which the preamble field contains defects. The described methodology may be effective at maintaining a small resulting phase error even when over 35% of the preamble is defective. Employing such a technique can be used to maintain the integrity of data stored on a hard-disc drive, and may be used to flag potential issues early such that data may be moved before it becomes unrecoverable. Additional details on sampling are provided in regard to FIG. 5.

Figure 5:
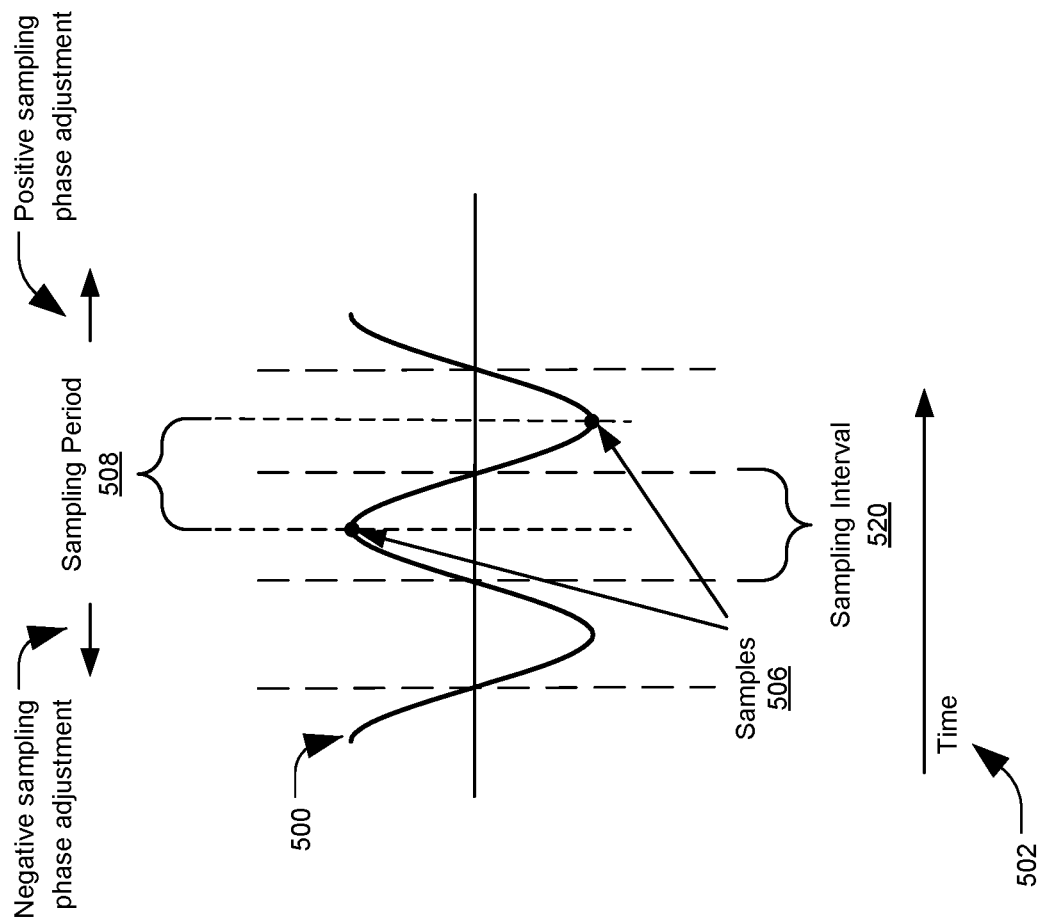
FIG. 5 is a diagram of a sampled signal for performing preamble defect detection and mitigation, in accordance with certain embodiments of the present disclosure.

Turning now to FIG. 5, a diagram of a signal pattern 500 is depicted, in accordance with certain embodiments of the present disclosure. A procedure for sampling the signal 500 to obtain sample values is described. Although a simple sine-wave signal pattern 500 is illustrated, such as may be used in a preamble pattern, the process may also apply to more complex signals. Signal pattern 500 may be received at an ADC in the form of a continuous voltage quantity received over a time period 502. The ADC may sample the signal 500 one time per sampling interval 520 to obtain sample values 506 representing the state of the signal 500 at the point in time when the signal 500 was sampled. There may be one or more sampling interval per bit period of the signal (e.g. the portion of the signal corresponding to the value of a single bit). The sampling period 508 at which the ADC samples the signal 500 may be controlled by a clock or timing signal provided to the ADC. The sampling period 508 may be represented in units of seconds per sample, while a sampling frequency may be represented in units of samples per second. The dashed lines 508 may represent a clock signal triggering a sampling by the ADC, with the black dots representing the sample points 506 and values.

Where the signal 500 is sampled within each sampling interval 520 may be referred to as the sampling phase. In the example embodiment of FIG. 5, sampling the signal 500 in the middle of the sampling interval 520 may perform peak sampling, where a sample is taken at a high or low point for a particular symbol of the signal 500 waveform. Similarly, a sine-wave sampled four times per period may be sampled at t, t+pi/2, t+pi, and t+3pi/2. However, the sampling phase may be shifted to the left or right within the sampling interval 520, by some percentage of the total sampling interval 520 (e.g. 5% of T). The sampling period 508 may remain the same, while shifting the sampling phase in a negative (e.g. left) or positive (e.g. right) direction.

At the start of a sector, the sampling phase with respect to the signal or written data pattern is unknown and uniformly random. As such, during acquisition the phase must be determined and the selected sampling phase achieved so that data can be correctly read. During acquisition, differences between the expected sample values of the selected signal pattern (e.g. the preamble) and the actual sample values obtained from the signal may be used to determine the phase at which the signal was sampled, and adjust the sampling phase to match the expected sampling phase. A plurality of samples may be taken during the preamble, and those samples can be used to set the sampling phase for reading the following data portion. However, defects in the preamble can produce irregular values and prevent proper synchronization of the sampling phase to the signal.

In order to detect and mitigate preamble defects, the samples used for acquisition may first be split into a number of groups of consecutive samples, with each group used to generate an estimate of the sampling phase. In the absence of defects, these phase estimates may be directly averaged to generate increasingly accurate estimates of the sampling phase. If, however, any sample group is deemed to contain a defect, its estimate may be removed from the overall computation in an attempt to eliminate its effect on the resulting sampling phase estimate. An example implementation of the proposed methodology is described herein. The proposed methodology may be performed by a preamble error detection module or another component of a system configured for signal processing and decoding.

The total acquisition procedure may take place over M samples, with the samples x denoted by $[x_0, x_1, \ldots, x_{M-1}]$. The M samples can be divided into G groups of L samples each, where the $k^{th}$ group of samples is denoted as, $$x_k = [x_{kL}, x_{kL+1}, \ldots, x_{kL+(L-1)}], \quad (1)$$

for $k \in \{0, 1, 2, \ldots, G-1\}$. For example, for L=10 samples per group, the samples of group k=0 may be $[x_0, x_1, \ldots x_9]$, while the samples for group k=4 may be $[x_{40}, x_{41}, \ldots x_{49}]$. The number of samples per group may be set by a manufacturer or determined by the device. For example, the number of samples per group may be some fraction or percentage of the number of samples taken during an acquisition operation. An example process of determining phase estimates from the samples is described in regard to FIG. 6.

Figure 6:
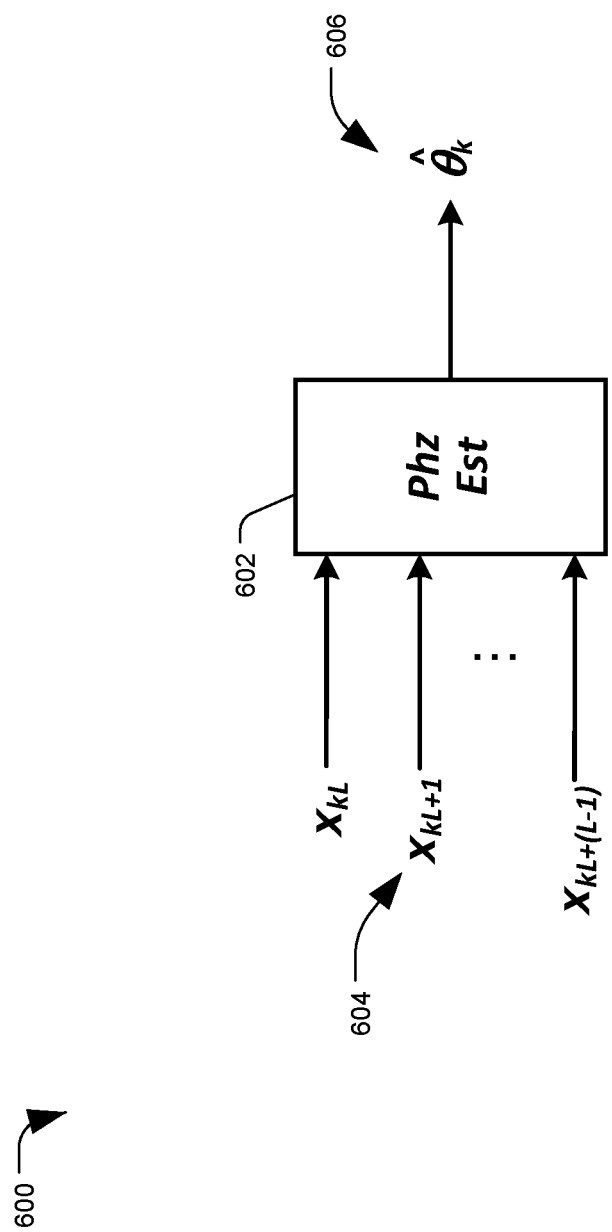
FIG. 6 is a diagram of a system configured to perform preamble defect detection and mitigation, in accordance with certain embodiments of the present disclosure.

FIG. 6 depicts an example block diagram 600 of a process for obtaining a phase estimate based on a set of samples, according to certain embodiments of the present disclosure. After the final sample in group k is produced, a sampling phase estimate ($\hat{\theta}_k$) 606 can be generated by applying this grouping of samples 604 to a phase estimation algorithm or phase calculation module 602 as, $$\hat{\theta}_k = PhzEst(x_k). \quad (2)$$

Here, PhzEst(•) 602 may be or apply a generic function which can be used to estimate the sampling phase given the indicated samples 604. The proposed methodology may be agnostic to the estimation technique applied by PhzEst(•) 602. As there exist known methods of estimating the phase of a sine-wave given its samples, discussion of the methods are omitted. The new sampling phase estimate 606 may then be used to update a best estimate of sampling phase for the entire preamble or sector ($\hat{\Theta}_k$) using all samples up to and including group k as, $$\hat{\Theta}_k = \left(\frac{1}{k+1}\right) PhzUnwrapSum(\hat{\theta}_i, i \in \{0, 1, 2, \ldots, k\}), \quad (3)$$

where PhzUnwrapSum(•) generates a sum of its arguments while addressing potential phase wrapping issues.

Phase unwrapping may be advantageous as adding and subtracting phases can be prone to wrapping effects. Phases may be expressed as degrees from 0° to 360°, with values close to 0° being very near to values close to 360°. "Wrapping" may occur when values "wrap around" from 0° to 360° (e.g. 17°, 7°, 357°) or vice-versa. For example, if k=2 and the associated phase estimates are ($\hat{\theta}_0 = 5°$, $\hat{\theta}_1 = 3°$, $\hat{\theta}_2 = 358°$), the resulting sum should be (5°+3°−2°)=6° rather than (5°+3°+358°)=366°. Performing the phase unwrapping when summing the individual phase estimates for each group can produce a more accurate best estimate of the preamble sampling phase ($\hat{\Theta}_k$).

The process outlined above may be used to generate a progressively more accurate preamble sampling phase estimate ($\hat{\Theta}_k$) as more preamble samples become available. An example process of mitigating the effects of media defects is outlined below. Defects may be mitigated by identifying and removing outlier groups from those used to estimate the preamble sampling phase. Two example approaches to removing outliers may include phase outlier removal and amplitude outlier removal.

Phase outlier removal may begin at the completion of sample group p, where p≥2, and may continue through sample group G−1 (e.g. the final group). Other values may also be used; for example, phase outlier removal may begin at the completion of sample group p≥4. At the start of the acquisition procedure, we may initialize a set of defective groups D to the empty set (e.g. no defective groups have been identified yet). After receiving the final sample of group k≥p is collected, the updated phase estimate for all collected groups may be computed as given by (3), after which the phase deviation, or phase error, of each of the individual group estimates from this newly computed estimate may be computed as, $$e_\Theta(k,j) = PhzDiff(\hat{\Theta}_k, \hat{\theta}_j), \quad (4)$$

where, PhzDiff(•) computes the difference of its two arguments. As described above, argument $\hat{\Theta}_k$ may represent the preamble sampling phase estimate, as calculated by (3), based on all currently analyzed sample groups, and argument $\hat{\theta}_j$ may represent the sampling phase estimate of a selected group j selected from the currently analyzed sample groups, as calculated by (2). PhzDiff(•) may be performed so as to avoid wrapping issues. The error computed in (4) (or, e.g., the absolute value or square thereof) may then be applied or compared to a threshold to determine if sample group j is likely to contain a defect. The threshold value may be selected to provide a reliable indicator of whether the phase estimate from group j deviates significantly from the preamble sampling phase estimate based on all groups. If sample group j is detected as containing a defect, the index for group j may be added to the defective index set as, $$D = D \cup j. \quad (5)$$

The offending phase estimate from group j may then be removed from the overall phase estimate computation for all subsequent groups as, $$\hat{\Theta}_k = \left(\frac{1}{k+1-|D|}\right) PhzUnwrapSum(\hat{\theta}_i, i \notin D). \quad (6)$$

In practical implementations of this procedure, a running sum can be maintained of the individual group estimates and, in the event a defective group is identified, the offending estimate could be subtracted from the overall sum to produce the defect compensated estimate. In this way, the resulting phase estimate may be free of any influence from sample groups deemed to contain defects.

In a similar manner to phase outlier removal, defects may be identified and excluded using amplitude outlier removal. Amplitude outlier removal uses a different approach than offered in the previous section by using amplitude estimates to discern defective sample groups. Here, when the final sample of group k is generated, in addition to the phase estimate given by (2), an amplitude estimate may also computed as, $$\hat{A}_k = AmpEst(x_k). \quad (7)$$

In some embodiments, in a manner similar to phase outlier removal, an amplitude error may be generated for each sample group as a deviation of an average or combined amplitude estimate for all evaluated groups from each individual group estimate as, $$e_A(k, j) = \left(\hat{A}_j - \left(\frac{1}{k+1}\right)\sum_{i=0}^{k}\hat{A}_i\right). \quad (8)$$

Again, this computation may begin to be performed upon the completion of sample group p, where, e.g., p≥2, since an estimate of at least 3 groups may be required for the computation of (8) to be meaningful.

In other embodiments, however, the amplitude error may be generated between each sample group amplitude estimate and a selected target value $A_t$ as, $$e_{A,t}(k) = (\hat{A}_k - A_t), \quad (9)$$

The magnitude of (or square of) the computed amplitude error can be applied to a threshold to determine if a sample group contains a defect. In the event that the amplitude error for a group index exceeds the specified threshold, that index may be added to a defect index set as given by (5), and the phase estimate may be adjusted as in (6).

The defect set may be used to identify sectors to reallocate. For example, if the number of groups in the defect index set exceeds a threshold, it may indicate that the preamble for the sector includes a large defect and is at risk of becoming unrecoverable. The data may be moved from the unreliable sector to a new sector, and a defect map may be updated to indicate the new location of the logical sector.

A point that could potentially complicate the implementation of the described methodology may be encountered in systems in which sampling phase adjustment is achieved by modifying the phase of the clock applied to the analog-to-digital converter (ADC). For example, a phase interpolator circuit may be used to perform this adjustment. The rate at which the sampling phase is adjusted may be limited since the resulting clock cannot contain short cycles, sometimes referred to as glitches, which can cause undesirable behavior from digital logic. Therefore, in systems which modify the sampling phase by adjusting the clock phase, early estimates of the sampling phase may be used to start an early adjustment of the sampling phase and, therefore, all preamble samples may not be captured using the same sampling clock phase. Samples obtained using different sampling clock phases may produce less reliable results using the methods described herein. Although this would seem to invalidate the phase averaging operations, as given by (3), it can be easily worked around by referencing all phase estimates to the sampling phase at the start of acquisition. Here, the PhzEst (•) function can be configured to "back out" or remove any phase adjustments, such that the resulting estimates do not include any phase movement (e.g. the phase estimate is of the starting sampling phase, or the sampling phase prior to any phase adjustment). As such, the current sampling phase may be easily computed as the starting sampling phase estimate added to the applied sampling phase adjustment, and all of the presented techniques are still applicable.

Figure 7:
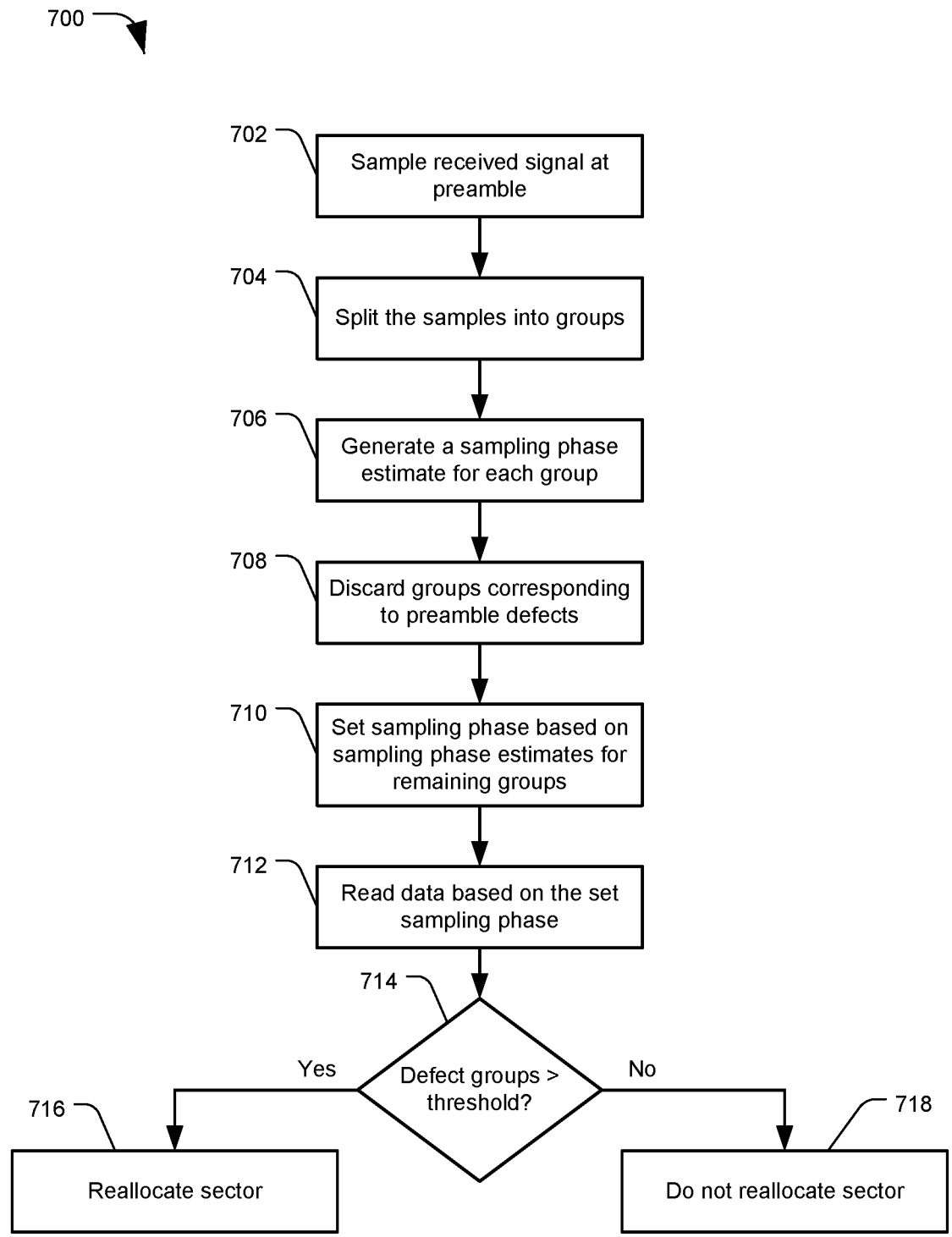
FIG. 7 is a flowchart of a method of preamble defect detection and mitigation, in accordance with certain embodiments of the present disclosure.
Figure 8:
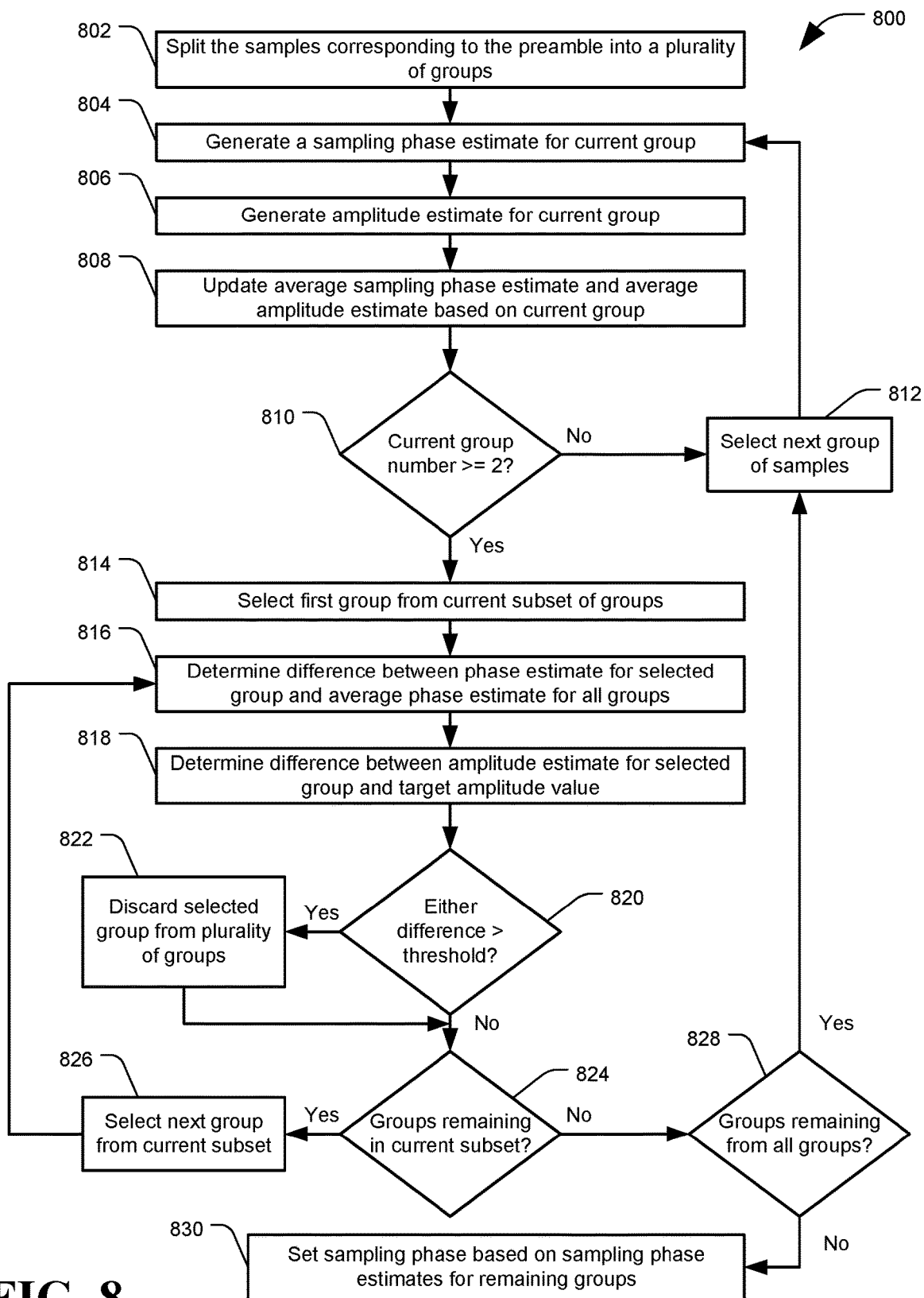
FIG. 8 is a flowchart of a method of preamble defect detection and mitigation, in accordance with certain embodiments of the present disclosure.
Figure 9:
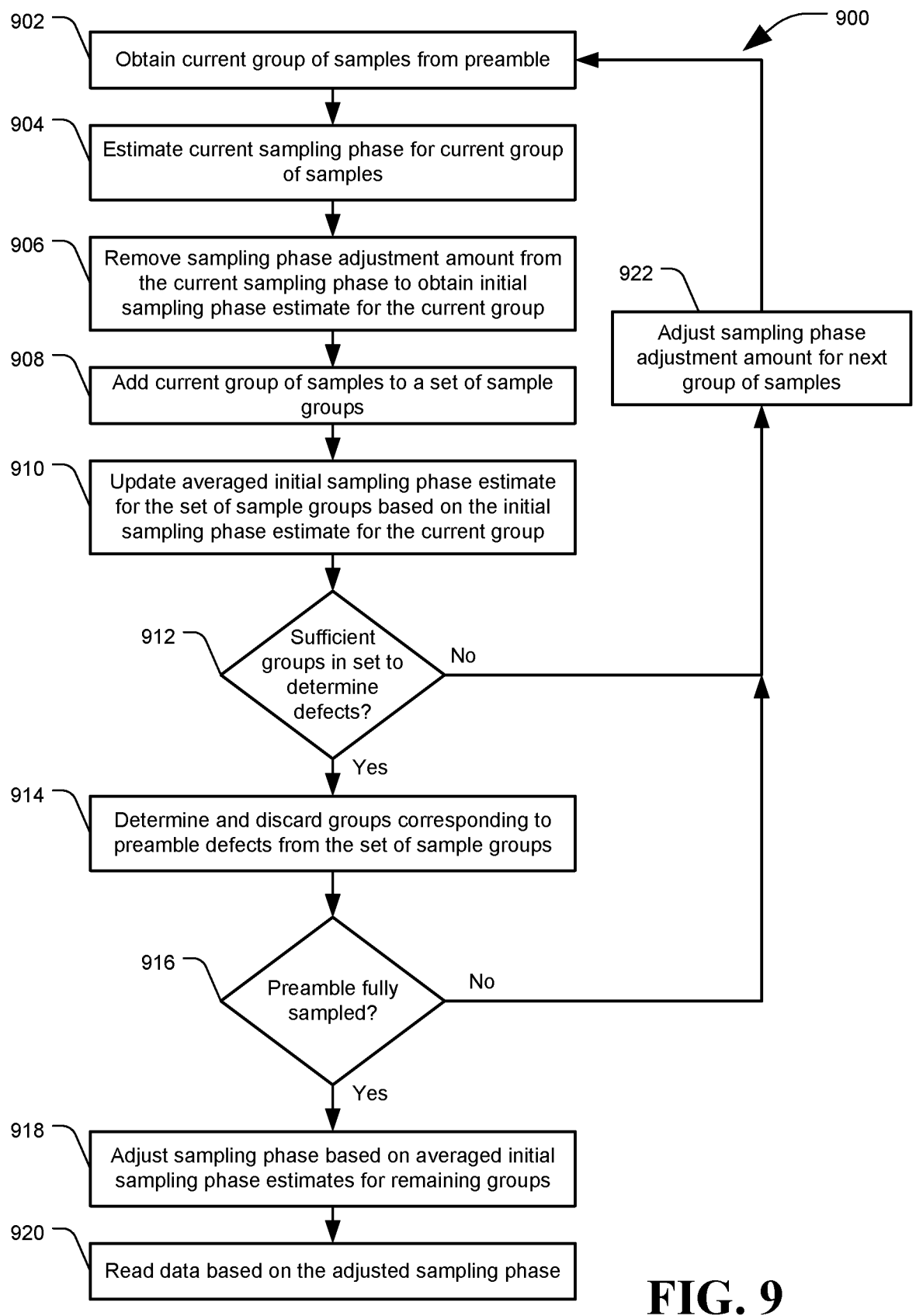
FIG. 9 is a flowchart of a method of preamble defect detection and mitigation, in accordance with certain embodiments of the present disclosure.

Example methods for preamble defect detection and mitigation are discussed in regard to FIGS. 7 through 9. The methods of FIGS. 7 through 9 may be performed by a preamble error detection module (PEDM) and other channel components as described herein.

FIG. 7 is a flowchart of an example method 700 of preamble defect detection and mitigation, in accordance with certain embodiments of the present disclosure. The method 700 may include sampling a preamble of a received signal, at 702. For example, preambles may precede data and servo sectors stored to a disc storage medium. The data storage device (DSD) may be configured to know the spacing between sectors, and may therefore know when to start sampling a next preamble.

The method 700 may include splitting the samples into groups or sets, at 704. A selected number of sequential samples may be allocated to each group; e.g. the first four preamble samples may comprise the first group, the next four preamble samples may comprise the second group, etc. The samples may be grouped as they are collected. For example, the first group may be completed when the fourth sample is received, and then the second group begins populating when the fifth sample is received. In some embodiments, the samples may be grouped at different intervals; e.g. after twelve samples are received, they are split into three groups of four. Other embodiments are also possible.

The method 700 may include generating a sampling phase estimate for each group, at 706. A sampling phase estimate for a group may be generated based on all samples contained in that group. At 708, the method 700 may include discarding groups corresponding to preamble defects. For example, the sampling phase estimates for collected groups may be compared, and outlier groups having significantly different phase estimates may be discarded. Similarly, the sampling phase estimates for all collected groups may be averaged or otherwise combined, and a difference between each group's estimate and the combined sampling phase estimate may be compared against a threshold to determine groups corresponding to defects. Defect groups may also be determined based on amplitude estimates or other metrics.

Once the groups of samples corresponding to defects have been removed or factored out, the method 700 may include setting a sampling phase based on sampling phase estimates for the remaining non-defect groups. Provided a significant portion of the preamble was defect-free, the resulting sampling phase estimate should be highly accurate and allow the sector to be read despite preamble defects. The method 700 may include reading data or sampling the signal following the preamble based on the set sampling phase, at 712.

Optionally, a determination may be made as to whether the sector has become unreliable due to preamble defects. For example, the method 700 may include determining whether a number of groups of samples corresponding to preamble defects exceeds a threshold value, at 714. If the number of defect groups does exceed the threshold, it may indicate that the sector is unreliable and the data should be relocated before the sector becomes unrecoverable. The sector may be reallocated to a spare sector, at 716, and the data read at 712 may be stored to the reallocated sector. If the number of defect groups does not exceed the threshold, however, the method 700 may include not reallocating the sector, at 718.

Turning now to FIG. 8, a flowchart of an example method 800 of preamble defect detection and mitigation is shown, in accordance with certain embodiments of the present disclosure. The method 800 may include a more detailed embodiment of the method discussed in regard to FIG. 7.

Method 800 may include splitting the samples corresponding to the preamble into a plurality of groups, at 802. A sampling phase estimate for a currently selected group may be generated, at 804. Optionally, an amplitude estimate may also be generated for the current group, at 806. The sample values for the current group, the sampling phase estimate, the amplitude estimate, or any combination thereof may be stored to a register or other memory. At 808, the method 800 may include updating an average sampling phase estimate and, optionally, the average amplitude estimate for the preamble based on the current group.

A determination may be made whether the current group number or index is greater than or equal to some selected value, such as two, at 810. Enough sample groups may need to be collected to accurately evaluate the groups for outliers that may indicate defects. The evaluated number may be based on how many groups are currently being used to generate the preamble sampling phase estimate, and may not include groups that have been discarded for containing a defect. If the current group's number is not greater than or equal to the selected value, the method 800 may include selecting a next group of samples as the current group, at 812, and generating a sampling phase estimate for that group at 804. For example, a next group may be selected once sufficient samples are received to populate the group.

If the current group number is greater than or equal to the selected value at 810, a first group from the current subset of groups may be selected, at 814. For example, if the current group was group number 3, the current subset of groups may be groups 1, 2, and 3. Group 1 may be selected first out of this subset as the selected group.

The method 800 may include determining a difference between the phase estimate for the selected group (e.g. group 1) and the average phase estimate for all groups (e.g. groups 1, 2, and 3), at 816. The method 800 may also include determining a difference between the amplitude estimate for the selected group and a target amplitude value, at 818. The target amplitude value may be a selected amplitude value indicating a "normal" or expected amplitude of a sample, or it may be the average amplitude estimate for all groups. The determined differences may be compared against a threshold value, at 820, to determine whether the selected group significantly deviates from the averages. There may be different threshold values for the phase estimate difference, the amplitude estimate difference, or any other compared metrics. In some embodiments, both differences must be greater than a threshold (or some percentage of differences based on the number of evaluated metrics; e.g. 2 out of 3 must be greater than a threshold) to trigger the conditional evaluation, rather than either difference. For example, assume three groups are being evaluated in the subset, and the first two groups correspond to a defective portion of the preamble, while the third group corresponds to a non-defective portion. Based on these three groups, the difference of the phase estimate of the first two groups may not differ greatly from the average, while their amplitude estimates may significantly differ from the target amplitude value. Since both values are not over the threshold, both samples may be retained for now. Similarly the third group may have a phase estimate that significantly differs from the average phase estimate, but the amplitude estimate is within the target amplitude value. Group three may therefore not be discarded either. As additional good groups are added to the subset, the phase estimates for groups 1 and 2 may begin to differ from the average more significantly, and those groups can be identified as defects more reliably and discarded.

If a difference is greater than a threshold (or in some embodiments, multiple evaluated differences are greater than their respective thresholds) at 820, the method 800 may include discarding the selected groups from the plurality of groups, at 822. In another example embodiment, rather than discarding a group immediately upon the threshold comparison, the determination of which group or groups to discard may be performed once most or all of the subset of groups have been evaluated. For example, there may be a hard limit set on the number of groups which may be determined to be defective, either within the subset or total. For example, a hard limit may be set that no more than five total groups from a preamble may be set as defective, and that no more than two groups from the currently evaluated subset may be set as defective. Accordingly, if multiple groups exhibit differences exceeding the respective threshold, at 820, the method 800 may include discarding only the group or groups having the largest deviation. For example, if two groups exceed the threshold, the larger of the two may be discarded in a system where the discard limit is one per subset. Or in a system with a discard limit of two groups, and three groups exceed the threshold, the two groups with the largest deviation may be discarded.

The average sampling phase estimates, amplitude estimates, or other values for the preamble may be re-computed without the influence of the discarded group (e.g. samples from the discarded groups are not included in the calculations). Re-computation of the values may be performed immediately, after the next group is introduced to the subset of groups, or at another point.

If the differences were not greater than a threshold, at 820, or after the selected group has been removed from the plurality of groups, at 822, the method 800 may include determining whether there are any more groups remaining in the current subset of groups, at 824. If there are groups remaining, the method may include selecting the next group from the current subset of groups (e.g. selecting group 2 after group 1), at 826, and the differences between the new selected group and the averages may be determined, at 816 and 818.

If there are no groups remaining in the current subset (e.g. groups 1, 2, and 3 have all been evaluated, and either discarded or retained), a determination may be made whether there are any more groups remaining from all of the plurality of groups, at 828. For example, the DSD may be configured to expect ten total groups of samples to be accumulated during the preamble. If less than all ten groups have been received and evaluated (e.g. there are groups remaining, at 828), the next group of samples may be selected as the current group, at 812, and a sampling phase estimate may be generated, at 804. If there are no groups remaining from all groups, the method 800 may include setting the sampling phase based on the sampling phase estimates for all remaining, non-defect groups, at 830.

FIG. 9 is a flowchart of an example method 900 of preamble defect detection and mitigation, in accordance with certain embodiments of the present disclosure. Method 900 may address an embodiment in which a sampling phase is adjusted during the preamble based on initial phase estimates, while still detecting and mitigating for preamble defects.

In previous examples, the entire preamble may be sampled at the same sampling phase, allowing the estimated sampling phases for each sample group to be averaged. However, in systems in which sampling phase adjustment is achieved by modifying the phase of the clock applied to the analog-to-digital converter (ADC) via a circuit known as a phase interpolator (PI), the rate at which the sampling phase is adjusted may be limited since the resulting clock cannot contain short cycles (referred to as glitches) which will cause undesirable behavior from digital logic. In these systems, early estimates of the sampling phase may be used to start an early adjustment of the sampling phase and, therefore, all preamble samples may not be captured using the same sampling clock phase. In order to perform the phase averaging operations as given by (3) to identify and discard defects in these systems, all phase estimates may be made in reference to the initial sampling phase used at the start of acquisition. Now, because we have introduced the concept of PI adjustment, the current method may include a concept of an "initial sampling phase", which is the sampling phase before PI adjustment, and a "current sampling phase", which is the sampling phase for a current group of samples that may be different than the initial sampling phase due to PI adjustment. This approach is similar to the previously described approach (e.g. FIG. 8), but instead of estimating the current sampling phase the process includes estimating the initial sampling phase.

For example, in order to relate the sampling phase for each sample group to the initial sampling phase, the phase estimator function of FIG. 6 can "back out" or remove from the current phase estimate any phase adjustments relative to the initial sampling phase. The resulting phase estimates may therefore all be relative to the initial sampling phase, and the methods described previously are still applicable. The initial sampling phase estimates for each sample group can be averaged together to determine an average sampling phase for the purposes of identifying and discarding defect sample groups.

Method 900 may include sampling the preamble to obtain a current group of samples, at 902. The method 900 may include estimating the current sampling phase for the current group of samples, at 904, for example by providing the samples to a phase estimator module. Any phase adjustment amount may be removed or "backed out" from the current sampling phase estimate so that an initial sampling phase estimate for the current group may be obtained, at 906. The initial sampling phase may be the sampling phase at which the first samples of the preamble were obtained, without any phase adjustment or phase interpolation applied to the clock signal controlling sampling at the analog to digital converter (ADC). For example, if the current group of samples is the first group of samples obtained from the preamble, the phase adjustment amount may be 0 and the no adjustment may be made to the phase estimate. However, if a phase adjustment of +10 degrees was applied when the current group of samples were obtained, then 10 degrees may be subtracted from the current sampling phase estimate for the purposes of obtaining a phase estimate value relative to the initial sampling phase.

The current group of samples, the initial sampling phase estimate, or other information for the current group may be added to a set of sample groups used to determine an averaged initial sampling phase estimate for the preamble, at 908. The set of sample groups may initially only include the first group of samples, and additional groups may be added as more samples are obtained. At 910, the method 900 may include updating the averaged initial sampling phase estimate for the set of sample groups based on the initial sampling phase estimate for the current group.

A determination may be made as to whether a sufficient number of sample groups have been added to the set of groups in order to make a determination as to which groups correspond to defects, at 912. For example, three or more groups may be required before defect analysis may be performed. If insufficient groups have been added, the current sampling phase adjustment amount may be modified (e.g. via a phase interpolator based on the current phase estimates), at 922, and a next group of samples may be obtained, at 902. The set of sample groups may be updated with new groups until a sufficient number of groups have been obtained to determine defects, at 912.

Once a determination is made that sufficient sample groups have been added to the set of groups, at 912, the method 900 may include determining groups corresponding to preamble defects and discarding them from the set of groups, at 914. For example, the initial sampling phase estimates for each group may be compared to an average initial sampling phase estimate for the set of groups in order to determine defects. Once discarded, the groups corresponding to preamble defects may no longer be included in the set of groups or considered when calculating sampling phase estimates and adjustments.

A determination may be made as to whether the preamble has been fully sampled, at 916. The preamble may be considered fully sampled when a sync mark at the end of the preamble is encountered, or a predetermined number of preamble samples have been obtained. In some embodiments, the preamble may be considered "fully sampled" once the predetermined number of preamble samples have been obtained, even if the sync mark has not yet been located. The search for the sync mark may continue, but samples beyond the predetermined number of samples may optionally not be used for further phase estimation.

If the preamble has not been fully sampled, at 916, the phase adjustment amount may be modified at 922, additional samples may be obtained at 902, and the averaged initial sampling phase estimate further updated at 910 based on the updated set of groups. Once the preamble is fully sampled, the method 900 may include adjusting the sampling phase (e.g. via the phase interpolator) based on the averaged initial sampling phase estimates for the non-defective groups in the set of groups, at 918. The data of the sector may then be sampled based on the adjusted sampling phase, at 920.

An example implementation of method 900 is provided herein. At regular intervals (e.g. the length of a group of a selected number of samples), a system may calculate updated estimates of the initial sampling phase. For example, at times t1, t2, t3, t4, estimates of the initial sampling phase p1, p2, p3, p4, respectively, may be obtained, where each estimate may be more and more accurate (e.g. due to averaging additional groups on each iteration). As an example, assume p1=10, p2=12, p3=9, p4=10. For this example, the desired sampling phase may be 20. So after determining p1, the system may adjust the phase interpolator (PI) by 10 in order to adjust the sampling phase from 10 to 20. The 10 adjustment may be backed out from the current sampling phase estimate of the next group of samples, in order to determine an estimate relative to the initial sampling phase (p2). After determining p2=12, a determination may be made that the PI should only be adjusted by 8 rather than 10 (e.g. to go from 12→20), so the PI may be adjusted back by 2 in order to alter the phase adjustment from 10 to 8. To determine p3, the phase adjustment of 8 may be subtracted from the current phase estimate of the next sample group. After determining p3=9, a determination may be made that the PI should be adjusted by 11, while the current phase adjustment is 8, so the phase adjustment may be adjusted forward by 3. After determining p4=10, a determination may be made that the PI should be adjusted by 10 relative to the initial sampling phase. The current phase adjustment is 11, so the PI may be adjusted back by 1. During this process, the initial phase estimate for each sample group may be averaged, and the average compared against the initial phase estimates for each group to identify defects. Any group of samples which is determined to correspond to a defect in the preamble may be discarded and not included in the sampling phase averaging. For example, assume a fifth group of samples is obtained at t5, having an initial phase estimate of 21 (e.g. after removing a phase adjustment of 10 degrees from the current sampling phase of the fifth group). If the initial phase estimate of the fifth group is significantly different from the averaged initial phase estimate of the set of groups (e.g. the difference is greater than a threshold), the fifth group may be discarded and not included in the calculation of the phase adjustment.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to:
  synchronize a sampling phase for sampling a signal pattern, including:
    sample a preamble field of the signal pattern to obtain sample values;
    split the sample values into a plurality of groups, each group of the plurality of groups including consecutively-obtained samples;
    determine defect groups from the plurality of groups having samples corresponding to defects in the preamble field;
    remove the defect groups from the plurality of groups; and
    synchronize the sampling phase based on the plurality of groups.

2. The apparatus of claim 1 further comprising:
synchronizing the sampling phase includes:
  determine a sampling phase estimate based on the plurality of groups, the sampling phase estimate based on a sampling phase at which the sample values were obtained; and
  adjust the sampling phase based on the sampling phase estimate to achieve a selected sampling phase.

3. The apparatus of claim 1 comprising the circuit further configured to:
generate a sampling phase estimate for each group, the sampling phase estimate based on a sampling phase at which sample values of the group were obtained; and
synchronize the sampling phase based on the sampling phase estimates of the plurality of groups.

4. The apparatus of claim 3 comprising the circuit further configured to:
determine a combined sampling phase estimate based on sampling phase estimates of multiple groups from the plurality of groups;
determine a phase error for each group, including:
  select a selected group from the multiple groups;
  determine a difference between the sampling phase estimate of the selected group and the combined sampling phase estimate; and
determine the selected group is one of the defect groups when the phase error of the selected group is greater than a threshold.

5. The apparatus of claim 3 comprising the circuit further configured to:
determine an initial sampling phase estimate, corresponding to an initial sampling phase at which a first group of samples from the plurality of groups is obtained, based on the sample values;
adjust the sampling phase by an adjustment amount relative to the initial sampling phase based on the initial sampling phase estimate, including controlling a phase interpolator to modify a clock signal;
determine a current sampling phase estimate for a current group;
remove the adjustment amount corresponding to the current group from the current sampling phase estimate to obtain an updated initial sampling phase estimate, the updated initial sampling phase estimate being the sampling phase estimate for the current group; and determine the defect groups based on the updated initial sampling phase estimate.

6. The apparatus of claim 1 comprising the circuit further configured to:
generate an amplitude estimate for each group;
determine an amplitude error for each group, including:
  select a selected group from the plurality of groups;
  determine a difference between the amplitude estimate of the selected group and a selected target value; and
  determine the selected group is one of the defect groups when the amplitude error of the selected group and the selected target value is greater than a threshold.

7. The apparatus of claim 6 further comprising:
the selected target value includes an average amplitude estimate based on amplitude estimates of multiple groups from the plurality of groups.

8. The apparatus of claim 1 further comprising:
the circuit includes a data channel of a data storage device, including:
  a receiver configured to receive a signal pattern;
  an analog front end to condition the signal pattern;
  an analog to digital converter to sample the signal pattern;
  a preamble error detecting circuit configured to determine the defect groups;
the signal pattern includes a signal generated by detecting a magnetic field recorded to a magnetic data storage medium using a read head;
the preamble field includes a preamble of a sector stored to the magnetic data storage medium;
the circuit further configured to:
  determine a number of groups in the defective groups determined for the preamble field; and
  reallocate the sector to a new location of the magnetic data storage medium when the number of groups is greater than a threshold.

9. A method comprising:
synchronizing a sampling phase for sampling a signal pattern, including:
  sampling a preamble field of the signal pattern to obtain sample values;
  splitting the sample values into a plurality of groups, each group of the plurality of groups including consecutively-obtained samples;
  determining defect groups from the plurality of groups having samples corresponding to defects in the preamble field;
  removing the defect groups from the plurality of groups; and
  synchronizing the sampling phase based on the plurality of groups.

10. The method of claim 9 further comprising:
synchronizing the sampling phase includes:
  determining a sampling phase estimate based on the plurality of groups, the sampling phase estimate based on a sampling phase at which the sample values were obtained; and
  adjusting the sampling phase based on the sampling phase estimate to achieve a selected sampling phase.

11. The method of claim 9 further comprising:
generating a sampling phase estimate for each group, the sampling phase estimate based on a sampling phase at which sample values of the group were obtained; and
synchronizing the sampling phase based on the sampling phase estimates of the plurality of groups.

12. The method of claim 11 further comprising:
determining a combined sampling phase estimate based on sampling phase estimates of multiple groups from the plurality of groups;
determining a phase error for each group, including:
  selecting a selected group from the multiple groups;
  determining a difference between the sampling phase estimate of the selected group and the combined sampling phase estimate; and
determining the selected group is one of the defect groups when the phase error of the selected group is greater than a threshold.

13. The method of claim 12 further comprising:
determining a set of groups from the multiple groups having phase errors greater than the threshold; and
determining at least one defect group from the set of groups, the at least one defect group including a selected number of groups with the selected number of largest phase errors among the set of groups.

14. The method of claim 9 further comprising:
determining an initial sampling phase estimate, corresponding to an initial sampling phase at which a first group of samples from the plurality of groups is obtained, based on the sample values;
adjusting the sampling phase by an adjustment amount relative to the initial sampling phase based on the initial sampling phase estimate, including controlling a phase interpolator to modify a clock signal;
determining a current sampling phase estimate for a current group;
removing the adjustment amount corresponding to the current group from the current sampling phase estimate to obtain an updated initial sampling phase estimate; and
determine the defect groups based on the updated initial sampling phase estimate.

15. The method of claim 9 further comprising:
generating an amplitude estimate for each group;
determining an amplitude error for each group, including:
  select a selected group from the plurality of groups;
  determine a difference between the amplitude estimate of the selected group and a selected target value; and
determining the selected group is one of the defect groups when the amplitude error of the selected group is greater than a threshold.

16. The method of claim 15 further comprising:
determining multiple groups from the plurality of groups having amplitude errors greater than the threshold; and
determining the selected group is one of the defect groups based on the selected group having the highest amplitude error from the multiple groups.

17. An apparatus comprising:
a clock signal generator configured to generate clock pulses;
an analog-to-digital converter configured to sample a signal at a sampling phase controlled by the clock pulses to obtain sample values;
a preamble error detection module configured to:
  split preamble sample values into a plurality of groups, the preamble sample values including sample values sampled from a preamble field of the signal, each group of the plurality of groups including a set of consecutively-obtained sample values;
  determine defect groups from the plurality of groups having sample values corresponding to defects in the preamble field;

remove the defect groups from the plurality of groups; and synchronize the sampling phase to the signal based on the plurality of groups.

18. The apparatus of claim 17 further comprising:

synchronizing the sampling phase includes:

generate a sampling phase estimate for each group, the sampling phase estimate based on a sampling phase at which sample values of the group were obtained;

determine a combined sampling phase estimate based on sampling phase estimates of multiple groups from the plurality of groups; and synchronize the sampling phase based on the combined sampling phase estimate to achieve a selected sampling phase.

19. The apparatus of claim 18 further comprising:

determining the defect groups includes:

determine a phase error for each group, including:

select a selected group from the multiple groups;

determine a difference between the sampling phase estimate of the selected group and the combined sampling phase estimate; and determine the selected group is one of the defect groups when the phase error of the selected group is greater than a threshold.

20. The apparatus of claim 17 further comprising:

a receiver configured to receive the signal;

a phase interpolator configured to:

modify the clock pulses to adjust the sampling phase;

receive an initial sampling phase estimate based on the sample values;

adjust the sampling phase by an adjustment amount relative to an initial sampling phase based on the initial sampling phase estimate; and the preamble error detection module further configured to:

generate the sampling phase estimate for each group, including removing the adjustment amount to obtain the sampling phase estimate relative to the initial sampling phase.

* * * * *